United States Patent
Silverman

(10) Patent No.: US 7,274,663 B2
(45) Date of Patent: Sep. 25, 2007

(54) SYSTEM AND METHOD FOR TESTING DIFFERENTIATED SERVICES IN A VALUE ADD NETWORK SERVICE

(75) Inventor: Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/737,553

(22) Filed: Dec. 15, 2003

(65) Prior Publication Data

US 2005/0128947 A1 Jun. 16, 2005

(51) Int. Cl.
*H04L 12/26* (2006.01)

(52) U.S. Cl. .................. 370/230; 370/252

(58) Field of Classification Search .......... None
See application file for complete search history.

(56) References Cited

U.S. PATENT DOCUMENTS

| | | | |
|---|---|---|---|
| 5,313,454 A | 5/1994 | Bustini et al. | 370/13 |
| 6,038,219 A | 3/2000 | Mawhinney et al. | 370/242 |
| 6,987,732 B2 * | 1/2006 | Gracon et al. | 370/235.1 |
| 2002/0080726 A1 * | 6/2002 | Klassen et al. | 370/252 |
| 2002/0107908 A1 | 8/2002 | Dharanikota | 709/203 |
| 2002/0110134 A1 | 8/2002 | Gracon et al. | 370/412 |

FOREIGN PATENT DOCUMENTS

| | | |
|---|---|---|
| EP | 996255 A2 | 4/2000 |
| WO | WO98/21845 | 5/1998 |
| WO | WO 02/49286 A1 | 6/2002 |

\* cited by examiner

*Primary Examiner*—Chau Nguyen
*Assistant Examiner*—Dargaye H Churnet
(74) *Attorney, Agent, or Firm*—Shelly M. Beckstrand

(57) ABSTRACT

A system for determining network characteristics includes a processor including a packet generation component and a packet evaluation component. The packet generation component generates send test packets for communication into the network. The packet evaluation component is responsive to receive test packets for determining network speed and utilization; upon detecting that the network streaming utilization is not significantly high, evaluates the test packet sequences for a first discard pattern representing actual discard red rate; and upon detecting that the network streaming utilization is significantly high, evaluates the test packet sequences for a second discard pattern representing effective discard yellow rate and effective non-discard green rate.

19 Claims, 10 Drawing Sheets

| TESTING CONDITION | DISCRETE UTILIZATION | STREAMING UTILIZATION |
|---|---|---|
| INVALID FOR TESTING | HIGH | HIGH |
| NOT POSSIBLE | LOW | HIGH |
| NO YELLOW DISCARDED; TEST FOR RED | LOW | LOW |
| YELLOW AND RED DISCARDED; TEST FOR YELLOW | HIGH | LOW |

FIG. 10

SYSTEM AND METHOD FOR TESTING DIFFERENTIATED SERVICES IN A VALUE ADD NETWORK SERVICE

BACKGROUND OF THE INVENTION

1. Technical Field of the Invention

This invention relates to a system and method for determining the characteristics of value add network services (VANs), including those of a frame relay (FR) network.

2. Background Art

Frame relay (FR) networks are set up by providers of value add network services and also by private companies. The objective is to provide quality service at attractive prices. FR is a "layer 2" protocol that can serve as a shared, underlying transport medium for one or more higher layer protocols, such as TCP and SNA.

Because of frame relay assignment of virtual circuits across a wide area network, a single connection into the network can serve to connect to many other locations, thereby providing secure, low cost, high performance connectivity. This is a hallmark of frame relay use by value add network (VAN) customers; for example, connecting a data center via a medium speed link (e.g., 256 Kbps) to a FR cloud (containing T1 links) and connecting many branch offices to the FR cloud over slow links (e.g., 56 Kbps), allowing any-to-any connectivity.

In order to protect its wide area network (WAN), a FR VAN supplier will provide a guaranteed level of service, referred to as a committed information rate (CIR, or "green" frames), a best-effort, burst excess (Be) level of service (between CIR and Be, or "yellow" frames), and an automatic discard level (above CIR+Be, or "red" frames).

A VAN supplier charges a customer more for a higher level of service (more green frames), and less for a lower level of service (more yellow and red frames). This enables users to tailor their costs and service to the amount of traffic they need to transmit.

Heretofore, users paying for value add network services, such as those of a frame relay service, have had no way of checking to determine whether or not they are receiving the level of service for which they are paying. In fact, suppliers of value add network services (VANs) frequently are not able to describe to users how the frame relay parameters are actually set for the customer. Consequently, there is a need in the art for a test method that can provide this information both to users and to suppliers of frame relay (FR) services.

Heretofore, assembling a network view that provides a measurement of the network's level of service involves coordinating activities and results among many parties. Even if all parties are acting in good faith, this coordination is difficult to achieve, and the effort often produces significantly erroneous results. Erroneous results occur, for example, if network device control block counters wrap or are otherwise contaminated, if network parameters such as hop speeds are input incorrectly or if changes made to network components are not accurately recorded. Such attempts, to be at all accurate, require that all of the devices in the entire network path be known, and that access to specialized control blocks on each device be provided in order to calculate loss rates and value add network characteristics. This requirement for access to control block information is difficult to fulfill end-to-end, especially in multi-organization and in very large single organization networks, because in these environments different groups control subsets of the network and for security, privacy, and political reasons do not allow outside parties access to control block data.

As is well known among those experienced in the art, values for network speed recorded into and stored in control blocks can be incorrect as a result of faulty user input, failure to change control block contents after a configuration change (e.g., a 56 Kbps link is upgraded to 128 Kbps and the control block representing link speed is not changed), or misinformation from the link supplier (the supplier does not provide the amount of capacity in the contract, e.g., a T1 link of 1.544 Mbps comprises twenty four 64 Kbps circuits. Instances are well known in which the staff of a supplier of T1 services has failed to "turn on" all the circuits in a T1, thereby in some cases supplying as little as 64 Kbps to the customer, instead of 1.544 Mbps.)

Without an accurate measure of speed, all network measurements are suspect. For example, if the speed characterization of a network facility is inaccurate, then all calculations of utilization and loss rate will be faulty, thereby causing incorrect problem determination and capacity planning. Example: a user contracts for a 128 Kbps service from a telecommunications company (telco) supplier. Inadvertently and by accident, the supplier only provides 64 Kbps (the technician only turns on one of the two 64 Kbps channels ordered by the customer). Not knowing of the telco error, the user sets the network speed control blocks in her/his network management software to indicate that link speed is 128 Kbps. Suppose further that after customizing the network management software this way, that application traffic flows at 64 Kbps. While there is actually 100% link utilization, the network management software will report only 50% utilization (packets per second times bytes per packet times eight bits divided by 128 Kbps)=0.5=50%. At 100% utilization, the utilization causes poor response time, poor throughput, and packet loss. These symptoms often point to overutilization, but the user's network management software, faultily customized because of erroneous information provided by the telco vendor, shows no utilization problem, which will lead to fruitless examination of all of the wrong potential causes of the network problem (time wasted examining cabling, application characteristics, tuning, parameter settings, etc.) Instead of diagnosing a utilization problem and coming up with a correct solution, the user will wrongly conclude that since there is no overutilization, there must be some physical problem with hardware, or some problem with the tuning or function of software, and will spend many hours fruitlessly trying to fix the problem.

Consequently, there is a need to a system and method in which true speed, timing, and loss characteristics of a frame-relay network can be determined—not based on values supplied by a vendor, but based on analysis performed by the end user.

Generally, where there is a service level issue to be resolved across end-to-end facilities whose components are owned by more than one party, the difficulty of obtaining full cooperation end-to-end increases dramatically in comparison with environments where there is only one owner of resources.

Consequently, there is a need in the art to provide a system and method for determining an end-to-end network view of level of service that requires no special device access or cooperation among parties, especially in value add networks where the telco supplier and end users comprise a multi-owner environment.

SUMMARY OF THE INVENTION

A program storage device, system and method for determining network characteristics by evaluating network streaming speed to determine network ingress access speed; evaluating network streaming utilization to determine ingress point utilization; evaluating network discrete speed to determine network path speed; evaluating network discrete utilization to determine network path utilization; testing while the ingress point utilization at a test ingress point to the network is substantially zero and the network path utilization across an entire network path is low to determine network time constant (Tc) and automatic discard (red) rate; and testing while the ingress point utilization at the test ingress point is substantially zero and the network path utilization across the entire network path is high to determine network committed information rate (green) rate and network burst excess (yellow) rate.

Other features and advantages of this invention will become apparent from the following detailed description of the presently preferred embodiment of the invention, taken in conjunction with the accompanying drawings.

BRIEF DESCRIPTION OF THE DRAWINGS

FIG. 10 is a tabular representation of testing conditions for discrete and streaming utilization.

BEST MODE FOR CARRYING OUT THE INVENTION

In accordance with the preferred embodiments of the invention, a system and method is provided for determining the characteristics of a frame relay (FR) network. Such characteristics include frame relay network time constant (Tc) value, committed information rate (CIR), burst excess rate (Be), and access speeds. In this way, a provider or a user may determine a network's transmission characteristics for green (non-discard-eligible), yellow (discard eligible), and red (automatic discard) frames.

Determining network characteristics is done by transmitting test packet sequences through the network for determining network discrete speed; determining network streaming speed; determining network discrete utilization; and determining network streaming utilization.

Upon detecting that network streaming utilization is not significantly high a set of test packet sequences is transmitted and its discard rate is evaluated to determine the network's actual discard red rate. Upon detecting that network streaming utilization is significantly high, additional test packet sequences are transmitted the discard patterns of which represent the network's yellow discard rate and the network's non-discard green rate. The network's time constant value and access speed are also determined, thereby providing full analysis of the network's characteristics and actual subscription parameters.

Figure 1:
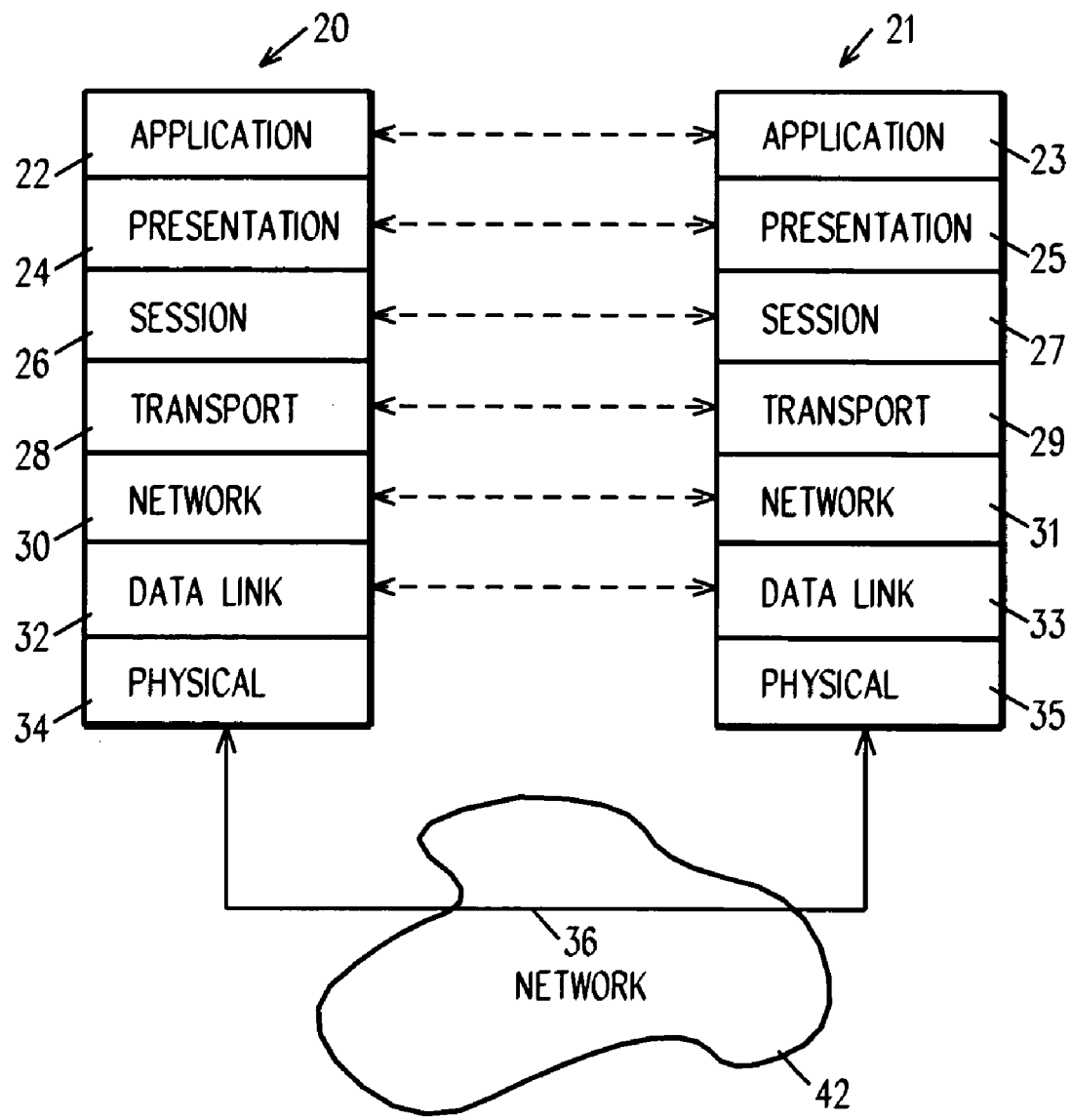
FIG. 1 is a high level diagrammatic view a protocol layer model.

Referring to FIG. 1, in accordance with the OSI model, seven layers of functionality include a physical layer 34, 35 connecting devices 20, 21 over a communication link 36 through network cloud 42, a data link layer 32, 33, a network layer 30, 31, a transport layer 28, 29, a session layer 26, 27, a presentation layer 24, 25, and an application layer 22, 23. (See McDaniel, George. IBM Dictionary of Computing, McGraw Hill, 1994, page 478.) Each layer conceptually provides function that is used by the next higher layer. The physical layer 34, 35 is the hardware: the specifics of how (electrically, and such) data is transmitted over a certain network medium 36. Data link layer 32, 33 is concerned with using the physical layer 34, 35 to move data from one machine 20 to another 21 on a single network 42. Network layer 30, 31 uses data link layer 32, 33 to move data from one machine to another over different networks.

In such a model, when implemented in a plurality of devices, such as client/server or branch office/branch office, or branch office/data center, communication is between corresponding layers: that is, application layer 22 of device 20 "talks to" application layer 23 of device 21, and so forth through each of the layers.

The OSI model of FIG. 1 is one example of a multi-layered protocol. Another is the TCP/IP (including Telnet) protocol having four layers, in which an application level corresponds to the application 22, presentation 24, and session 26 layers of the OSI model; TCP and UDP levels corresponds to network level 30; and device drivers and interface cards correspond to network layer 30 and physical level 34.

Frame relay resides in transport level 28 (layer 2 in the TCP/IP model) of a multi-level communication protocol model. In an exemplary embodiment, test probes flow at network level 30, 31 and the analysis of the probes is performed at the application level 22, 23.

In any value add service there is likely to be a recurring time period, or time constant (Tc), over which service provision is measured. In a frame relay network, Tc is usually 1 or 2 seconds, so that in each Tc interval, the slate is wiped clean and measurement starts over.

For example, in frame relay, if Tc=2 seconds, CIR=30 kilobits per second (Kbps), and network access speed is 56 Kbps, then in every two second network interval, the 1st 60,000 bits transmitted are "green" (i.e., guaranteed delivery). The 60,000 bit figure is Tc*CIR or 2 *30,000.

The system and method of the invention may be applied to public and private frame relay networks, or any other public (value add) or private network in which admission of traffic into the wide area network is controlled by a periodic clocking window, local traffic seeking entry into the wide area network during each window interval is measured, and traffic is controlled by discarding excess traffic during each interval as determined by system parameters that govern admission of traffic into the wide area network.

The frame format for a frame relay network 44 is
FLAG ADDRESS INFORMATION FCS FLAG
Where Flag is a frame start and end deliminater 1 octet (byte) in length.
Address is a Data Link Connection Identifier (DLCI) that indicates the virtual connection through the network this packet will use, usually 2 octets in length (can be 3 or 4).
Information is data being carried by the frame relay network. The field is variable in length. For example, this data could be any or all of SNA packets, TCP/IP packets, LAN packets, or the ICMP (ping)packets used for testing the network in accordance with the present invention.
FCS is the frame check sequence, 2 octets in length, which is an algebraic computation representing the original bit configuration of the frame. If any bits in the packet are altered or lost, then the FCS will no longer match the frame contents and the receiving station will drop the frame. If a frame relay network discards all bits in a frame, the frame is simply not transmitted. If a portion of the frame is not transmitted, then at least one of the four portions of the frame will be truncated (corrupted), and the receiving station will discard the portion that it receives.

In networks the functions of "red," "yellow," and "green" packets are commonly referred to as 'Differentiated Services' or 'DifServ'.

In accordance with an exemplary embodiment of the invention, time stamped samples together with the architecture of time relay implementations are used to determine FR network characteristics including green CIR, yellow BE, and red BE+CIR transmission rates.

Figure 8:
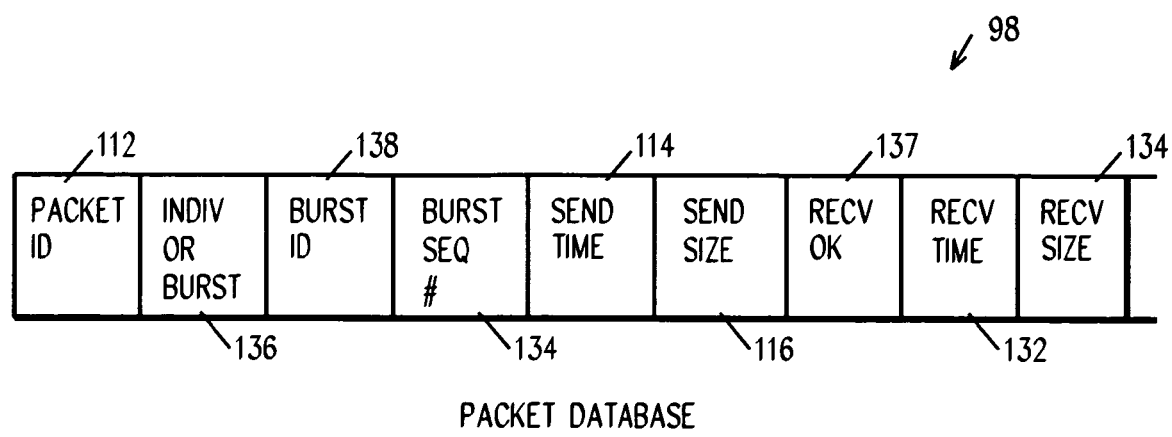
FIG. 8 is a diagrammatic representation of a packet evaluation database.

Referring to FIG. 8, sequences of packet transmissions (individual frames and pluralities of frames of different sizes) are used to create a time stamped results database 98 from which the network's characteristics may be calculated. Table 98 includes for each packet, packet ID 112, send time 114, send size 116, receive time 132, receive size 134, and packet received successfully flag 135. Packet ID This has sub-fields. Sub-field 136 indicates whether this test packet is individual or one packet in a burst. If it is a member of a burst, then field 138 contains the ID (numeric or alphanumeric identifier) of the burst, and field 134 the sequence number of this packet within that burst.

In the course of determining these characteristics, network speed and utilization are determined, according to methods described in copending U.S. patent application Ser. No. 09/267,843, filed 12 Mar. 1999, entitled "System and Method for Analyzing and Tuning a Communications Network"; Ser. No. 09/452,403, filed 1 Dec. 1999, for "System and Method for Monitoring Performance, Analyzing Capacity and Utilization, and Planning Capacity for Networks and Intelligent, Network Connected Processes"; Ser. No. 09/746,183 filed 21 Dec. 2000, for "System and method for Determining Network Throughput Speed and Streaming Utilization"; and Ser. No. 09/746,179 filed 21 Dec. 2000, for "System and Method for Determining Network Discrete utilization". Hereafter these patent applications are referred to collectively as Silverman, et al.

As more fully described in Silverman, et al., when determining streaming utilization, a plurality of bursts of test packets (generally ten packets per burst) is transmitted and the results analyzed.

For determining discrete utilization a plurality of transmissions of individual packets of different lengths (in an exemplary embodiment, without loss of generality, packets of two sizes, one "short" and one "long") are transmitted, each packet in isolation from the other and not in a burst. The network's discrete speed is calculated by considering the best end to end round trip time for long packets and short packets, as described in detail in Klassen and Silverman. The best time for the short packet is subtracted from the best time for the long packet and the number of short packet bits is subtracted from the number of long bits. The resulting ratio of bits divided by time determines the network's discrete speed.

The streaming speed, discrete speed, and streaming utilization of a network provide a basis for the calculation of its discrete utilization. In addition to these values, the average queue wait time for service "Tw", and the standard deviation of the average queue wait time for service "σTw" (i.e., sigma Tw) are used in the calculation of discrete utilization. These queue wait time values are calculated from the time stamped database records of the plurality of discrete test ping transmission samples by standard statistical analysis.

Network Streaming Utilization (the percent of the network currently in use that is not available to a user commencing use of an application that will stream traffic along the end to end network connection.)

Formula:

network streaming utilization=(network streaming speed/average network streaming speed)*100.

This includes overhead incurred for retransmissions.

Network Discrete Speed (this is the end to end rate at which datagram traffic will be carried across the network if the network is empty of other traffic and there is no retransmission required.)

Formula:

network discrete speed=(long packet bits−short packet bits)/(best long time−best short time)

Figure 2:
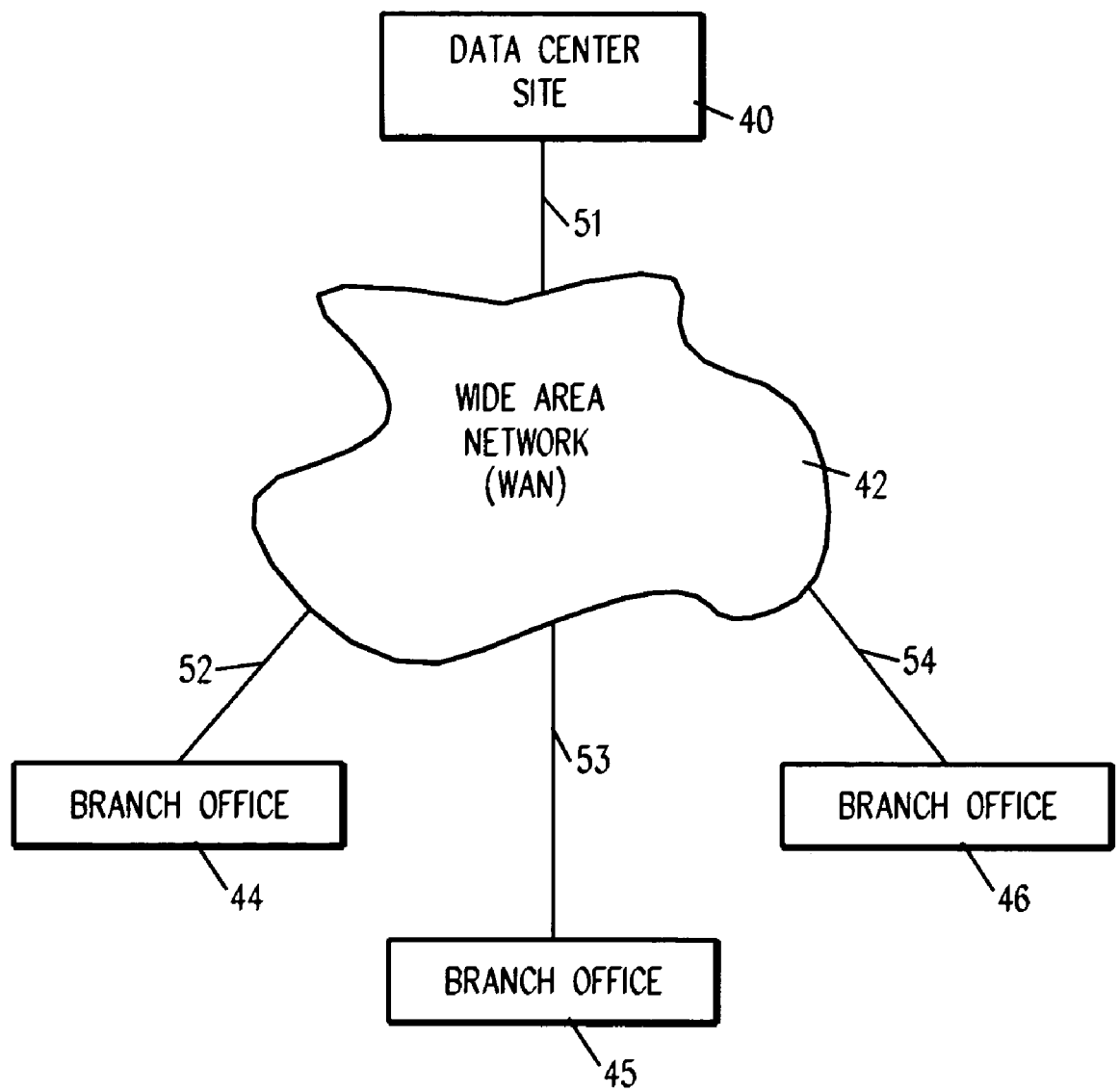
FIG. 2 is a high level diagram of access nodes on a wide area network.

Referring to FIG. 2, an exemplary FR network implementation includes a plurality of branch offices 44-46 accessing a data center site 40 through a FR network WAN 42. In this exemplary embodiment, branches 44-46 access network 42 by means of relatively slow 56 Kbps links 52-54, datacenter 40 connects to the FR net 42 by means of 256 Kbps link 51, and FR network WAN 42 comprises T1 and faster links.

With this example, the bidirectional throughput rate between a branch 44 and datacenter 40 will measure at 112 Kbps (56 Kbps*2=112 Kbps), assuming the connection 51, 42, 52 is full duplex). The preferred embodiment of the system and method of the invention determines the speed of the access point at a connection, say 52, into network 42.

The process for determining speed also allows for determining average delay of a burst, and thus for determining the streaming utilization of network 42.

Speed is determined by constructing a "virtual best burst", as described in U.S. patent application Ser. No. 09/746,183. The comparison between the receipt time of the virtual best burst, constructed from an anchor point of a best individual packet and then, successively, a best 2nd, 3rd, and nth packet relative to that anchor point, with bits in virtual burst*2 divided by receipt time of virtual burst, gives bidirectional network speed. Taking the average burst receipt time and then calculating its speed, which will be less than or equal to the speed of the virtual best burst, tells what percent of the bandwidth is available. From available streaming bandwidth and total streaming bandwidth, the network streaming utilization is derived.

A network 42 discrete utilization is determined as described in U.S. patent application Ser. No. 09/746,179. Streaming utilization represents how much of the network 42 capacity is being used with respect to throughput-oriented application traffic (such as file transfers). Discrete utilization describes how much of the network capacity is being used with respect to applications that are sending individual packets (such as transaction-oriented, conversational traffic) from branch office 44 into WAN 42.

In all cases, a network 42 discrete utilization is greater than or equal to that network streaming utilization.

Figure 3:
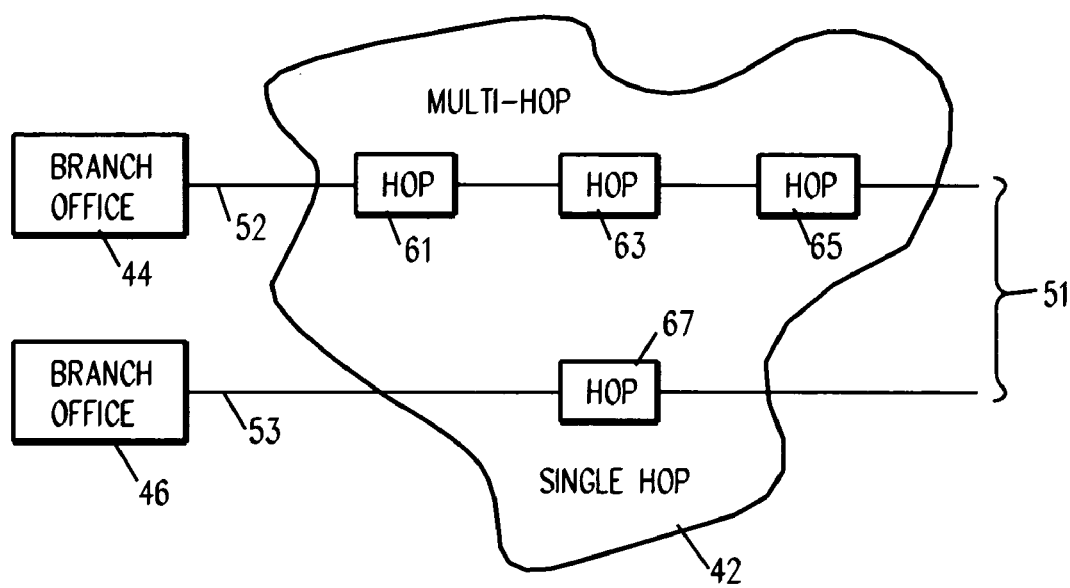
FIG. 3 is a diagrammatic representation of multi-hop and single hop paths through a wide area network.

Referring to FIG. 3, a single hop 67 connection 53 through WAN 42 from branch office 46, and a multi hop 61, 63, 65 connection 52 through WAN 42 from branch office 44, each to and from data center 40 over line 51, is illustrated. In a single hop 64 network 42, discrete and streaming utilization are equal. In a network of greater than one hop, if there is utilization on two or more the network hops 61-63, then discrete utilization will be greater than streaming utilization. This is because streaming traffic is slowed by utilization only as it affects the bottleneck rate of the network, whereas discrete traffic is slowed by utilization at every hop 61, 63, 65, and not just the bottleneck.

The difference between discrete and streaming utilization is used to determine the characteristics of the frame relay network. This is tested from a "branch office" site 44. As described above, this access point 52 will be the slowest part of the network. So absent very high utilization in the WAN 42 portion or datacenter access point 51 of the network, the access link 52 will be the bottleneck.

It is generally very easy to perform testing from such a site at a time when it is known that there is no local utilization. For example, branch office 44 network access utilization is generally characterized by online transaction data traffic during the day, followed by file transfer of daily activity to the datacenter 40 after regular business hours, followed by an upload from the datacenter 40 to all branches 44-46 after nightly consolidation batch runs. There are breaks between these regular communications (e.g., after the nightly upload completes but before daily online processing begins) during which there is little or no traffic. By performing testing at such a time, zero or near-zero streaming utilization may be expected, with possibly some discrete utilization (reflecting utilization in WAN 42 or datacenter 40 portions of the network but very little or none on the local access portion 52, which is the slowest portion of the connection).

Figure 4:
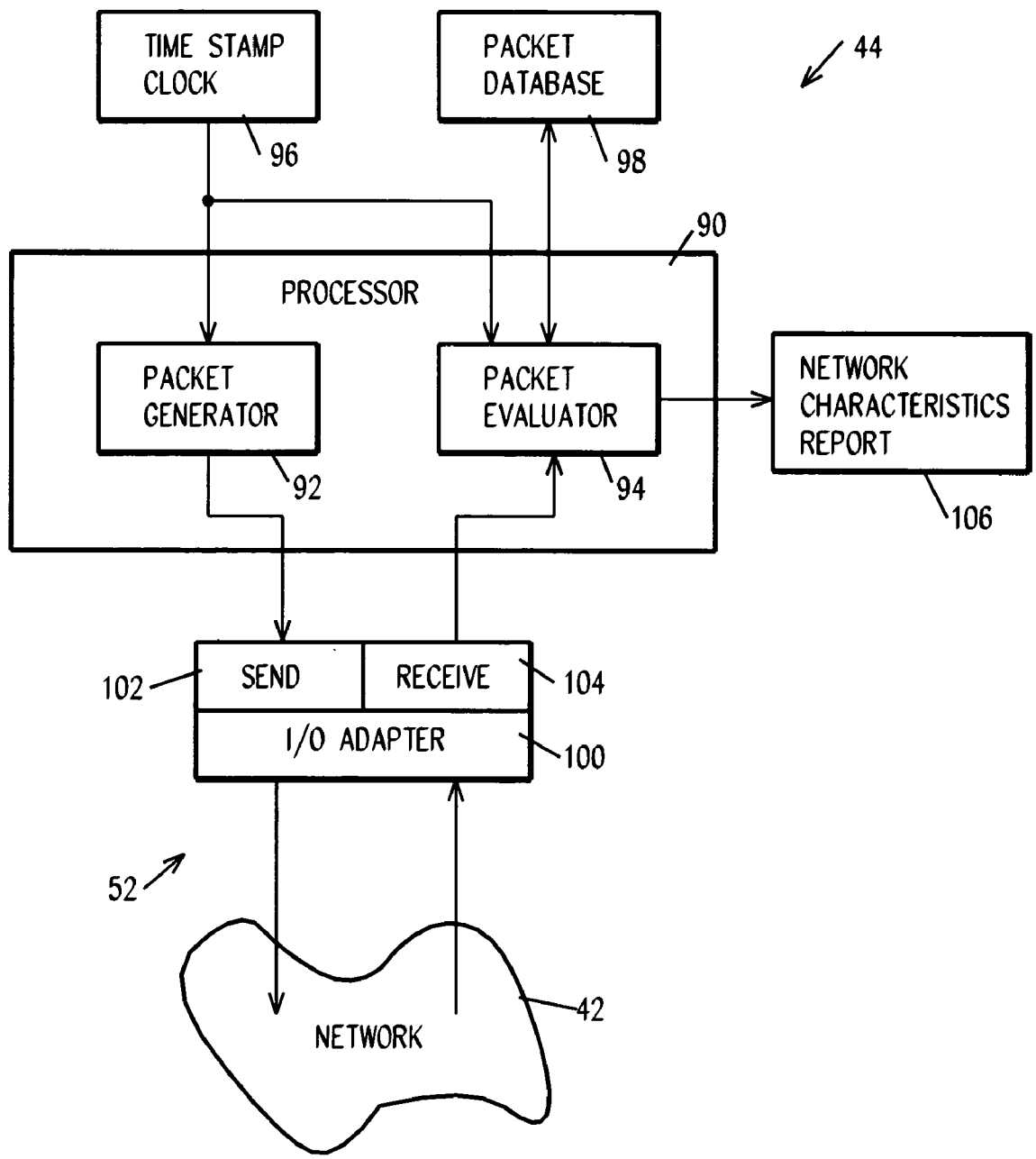
FIG. 4 is a high level system diagram illustrating components used in determining network characteristics.
Figure 6:
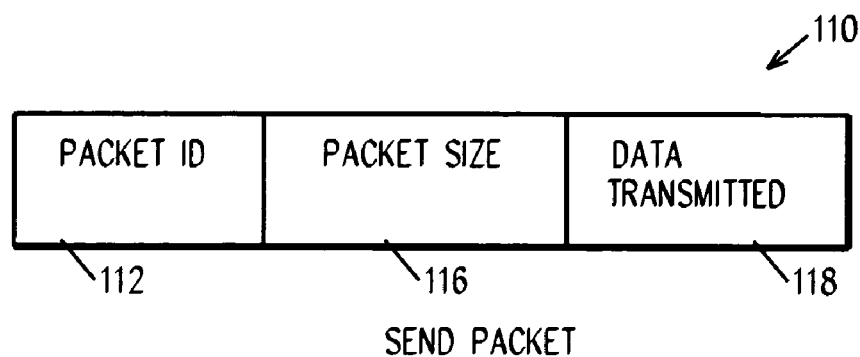
FIG. 6 is a diagrammatic representation of a send packet.
Figure 7:
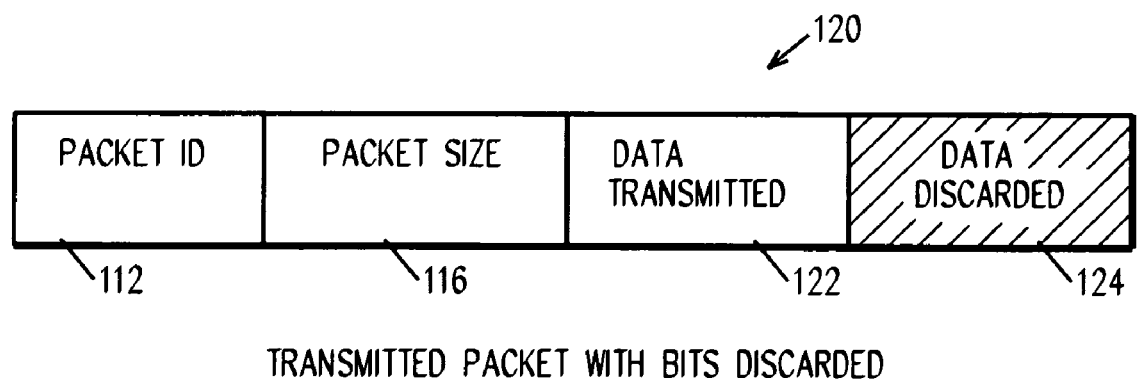
FIG. 7 is a diagrammatic representation of a receive packet.

Referring to FIG. 4 in connection with FIGS. 6-8, selected components of an exemplary embodiment of a branch office 44 include a processor 90 having a packet generator component 92 and a packet evaluator component 94.

A time stamp clock component 96 is used by processor 90 to generate send times 114 and receipt times 132 for packets 110. (Time stamp clock 96 is an external function, not something included within the packet 110.) Packet generator 92 generates test packets 110 to send buffer 102 which is sent into the network 42 on communication link 52 by I/O adapter 100. Send packets 110 include a packet ID 112, packet size 116, and data 118 which may include a single window or bursts of a plurality of windows of data. These packets 120 are echoed back to branch office 44 through network 42 into receive buffer 104. Received packets 120 include a header 112, 116 as in the send packets, and then data bits 122 which would be the same as data bits 118. If any header or data bits 124 are discarded by network 42, then in a preferred embodiment of the invention packet 120 is discarded immediately and not forwarded back to branch office 44.

As an example, if a VAN service provider at hop 63 on WAN network 42 were to discard data bits 124 from send packet 110, then next network hop 65 would receive a packet 120 that is truncated because bits 124 have been dropped from that packet. Standard network checksum processing (sometimes called a 'parity check' or a 'cyclic redundancy check') performed at next hop 65 (or failing that, at some later hop) would detect that packet 120 has been altered (damaged) and the damaged packet 120 would not be forwarded. For ping packets 110 successfully echoed back to receive buffer 104, packet evaluator component 94 evaluates the received packets 120, updates fields 132, 134 and 137 in packet database 98 and generates network characteristics report 106, as will be more fully described hereafter.

Figure 5:
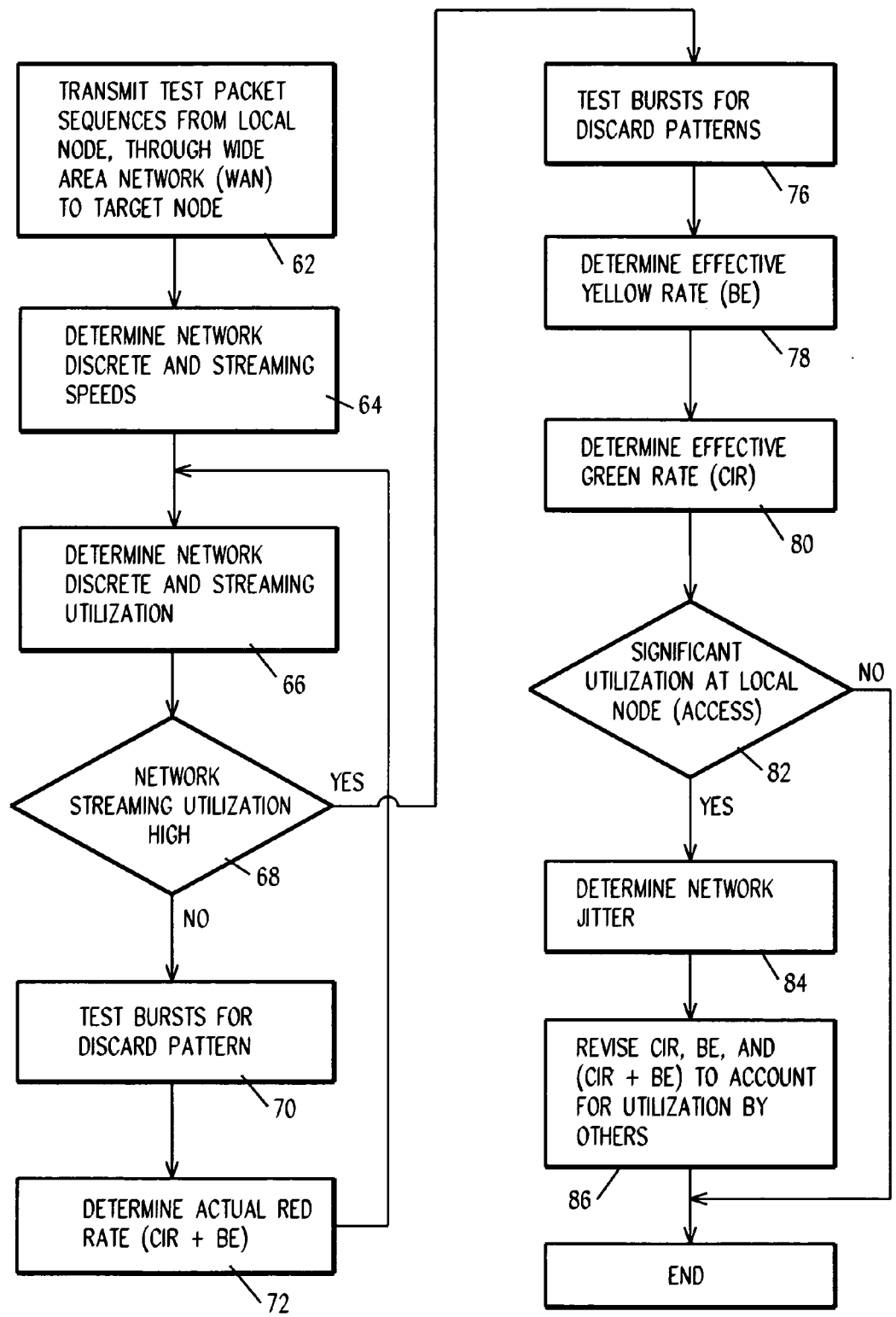
FIG. 5 is a flow chart representation of the method of the invention for determining network characteristics.

In operation, referring to FIG. 5, in step 62, packet generator 92 transmits test packet 110 sequences from local node 44 through wide area network (WAN) 42 to target node 40. These packets are echoed back through network 42, and in step 64 the received packets 120 are evaluated by packet evaluator component 94 to determine the discrete and streaming speeds of network 42 (that is, of the path 52, 42, 51), and in step 66 the discrete and streaming utilization of that path.

In step 68, network streaming utilization is evaluated to determine if it is "high", that is, is the network substantially utilized. If not, streaming utilization is zero or low, and in step 70, packet evaluator 94 tests (in a preferred embodiment by reference to database 98) the received bursts for discard patterns and from those patterns determines the actual red rate (CIR+Be).

When a condition of little or no traffic is detected (that is, step 68 determines that network streaming utilization is not high), bursts of packets may be sent into the network. With network 42 set up so as to automatically discard bits past a certain threshold (i.e., if there are red packets), then bursts of successively larger numbers of echo packets 110 will show a pattern of discards. From this, in step 72 the network Tc value (time constant) is determined, as well as the network's automatic discard rate (that is, the "red" rate) above which frames 124 are discarded, which mathematically is the sum of the CIR rate plus the Be rate.

With Tc and Be+CIR known, Be and CIR are determined as follows.

In steps 66 and 68, the network utilization is again determined. When an instance is found in which local access utilization is negligible or zero but that utilization in the WAN portion of the network is very high, in step 76, branch 44-to-branch 46 performance is measured at a time when it is known that neither branch has any traffic load.

When in step 76 traffic is burst into the above environment, expected red frame loss will be observed and also potentially additional loss. The additional loss is loss of discard eligible yellow packets. This occurs in an environment where initial testing at step 70 determines that there is no yellow loss because it was verified in step 68 that there was zero streaming utilization and low discrete utilization, so that no network 42 resources 61-63, for example, end-to-end were stressed. By observing loss in this environment, red loss 154 was observed and calculated in step 72. By observing in step 76 a branch to branch test when discrete utilization is high but streaming utilization is zero (step 68, yes branch), the utilization is determined to be high in the WAN 42 and zero at the access points 52, 53 (otherwise, if non-zero at access point, streaming utilization would also be non-zero). The maximum frame loss rate determined in step 78 under these conditions gives the effective yellow rate of the network at that time. Knowing the effective Be rate, in step 80 Be is subtracted from Be+CIR to give CIR. (These are the "effective" CIR and Be rates, not necessarily the rates contracted for. Since they tell what service the user is actually getting—whether some green packets are being discarded or some yellow packets are not being discarded) when the network is under stress.

Thus, the network actual access speed, actual red rate, and effective yellow and green rates of the network are determined when the network is actually under stress.

In the above manner, frame relay network (or other VAN characteristics) are determined using probes (deliberately sized and timed transmissions of test packets 110) to deduce the network complete base metric (latency, streaming speed, streaming utilization, discrete speed, discrete utilization, and jitter).

In step 82, in the event that there is significant utilization at local node 44, jitter is determined in step 84 and in step 86 the network characteristic determinations CIR, Be, and CIR+Be revised accordingly.

Jitter represents the degree of variation of delay—the greater the jitter, the more bursty the traffic. In certain cases it may not be possible or practical to test the network at a time of low (near-zero) or zero utilization. Siverman, et al. (supra) describe the determination of the base metrics in such conditions. In order to calculate red and yellow loss rate in an environment in which there is non-trivial utilization in the access portion of the network (the location at which frames are characterized as green, yellow, or red), any test results for determining the CIR, Be, and Tc are algebraically modified in step 86 to account for percent utilization of capacity in use by others. For example, if utilization is 30%, testing consumes 70% of the facility. So the observed loss rate will, over time, be 30% lower than the actual total loss rate. If jitter is low, sampling will have arrived at stabilized results quickly. If jitter is great (use of the network by others is very bursty), then a stabilized test value is determined in a longer period.

When measuring a frame relay-type network, jitter is defined as the standard deviation of the delays of observed, successful (non-discarded) discrete samples. For purposes of testing for realtime networks (such as VoIP, voice over IP) jitter is calculated by the delta between the best observed discrete sample and worst observed discrete sample.

Several examples illustrate the operation of the process described above.

In a first example, pings of 70 bytes in length are used. Access speed from branch office 44 into network 42 over link 52 is 56 kbps (56000 bps). The Tc window is set at 1 seconds. CIR is set at 28 kbps. Be (BURST EXCESS) is set at 14 kbps. The following formulas apply:

$$CIR*Tc=28000*1=28000=\text{green bits per } Tc \text{ window.} \quad (1)$$

$$Be*Tc=14000*1=14000=\text{yellow bits per } Tc \text{ window.} \quad (2)$$

$$(\text{Access Speed}*Tc)-(\text{green bits per window}+\text{yellow bits per window})=(56000*1)-(28000+14000)=14000=\text{red bits per window.} \quad (3)$$

These green, yellow, and red values have the following meaning. The frame relay (VAN) network has multiple ingress points 51, 52, 53, 54 which are generally of slow speed as compared with the network's backbone (interior) portion 42. Nevertheless, the sum total, aggregate speed of all ingress points added together is generally greater than the speed of the backbone.

In order to protect backbone 42 from being flooded, the network protects itself in two ways. First, at each ingress point 51-54 clocking is performed by a timer that is set to measure repetitively a time interval usually of one or two seconds. The interval is known as the time constant and is denoted 'Tc.' During each time constant, user traffic is determined to be green, yellow, or red with the meaning that green traffic is guaranteed delivery (network 42 will do everything possible to get it across the network), yellow traffic is discard eligible (best effort delivery, if there is congestion within the network it may be discarded at the point of congestion), and red traffic is automatic discard (it is discarded at the ingress point to the network regardless of whether or not there is congestion anywhere in the network).

The smallest unit of traffic in a network is a bit, with eight bits forming a byte. In TCP/IP networks, traffic consist of packets 110 of data, with each packet having a twenty byte IP header, a twenty byte TCP header, and then a variable number of bytes of user data 118. If any bits in a packet are red (some bits 124 in the user data portion 118 of the packet 110 have been discarded) the entire packet 120 will be discarded by the network.

During each Tc window, as the user transmits packets into the network, a counter in packet generator 92 keeps track of the number of bits transmitted. When the window interval ends, the counter zeroes out and starts over. During each interval, the first user bits in, up to the limit of value CIR*Tc are green. The next bits in up to the quantity Be*Tc are yellow. Then any remaining bits transmitted during that Tc window are red.

Continuing with the example shows how the method for evaluating a value add network works. Packet generator 92 generates bursts of ping packets 110 which send component 102 and I/O adapter 100 transmit into network 42 to datacenter site 40 across WAN 42 and datacenter local access link 51 at a time when it is known that there is no other utilization by local site 44. The pings are evaluated per Silverman, et al. to determine the network streaming speed. (The network streaming speed is the speed at which applications that fill the connection, such as file transfers, will receive service.)

In order to test branch office 44, testing is performed from 44 across WAN 42 and to Data Center site 40. Generally speaking, the Data Center site's ingress speed to the WAN will be significantly greater than that of any branch office, and the WAN hops 61, 63, 65 speeds will each be significantly greater than the ingress speeds of locations 51-54 at the edge of WAN 42. Thus, when testing from a branch office 44 to a data center 40, the branch office ingress link 52 to the network will be the bottleneck link along the connection. As a consequence, the streaming speed measured across the network, which is the bottleneck speed along the path, will be the speed of the Branch office ingress link 52. Thus, this method provides a first step for independently determining whether a supplier of Value Add Network services is providing service at the level for which the customer is paying—namely, whether the network access speed equals or exceeds the contract speed.

Next, in steps 64 and 66 the network discrete speed (which is the rate at which individual packets are handled in the end-to-end network) and discrete utilization are determined. Discrete utilization can be calculated as in Silverman, et al., or, since in this instance there simply needs to be very low discrete utilization for valid testing to occur, from the individual pings transmitted in step 62, the best observed cross-network round trip time can be subtracted from the average cross-network round trip time to derive the average queue time across the network if streaming utilization is zero, then there is no hop 61, 63, 65 whose utilization is causing it to have a currently available rate that is less than the bottleneck link—which in turn means that there is zero utilization on the local link, which also happens to be the bottleneck link.

If discrete utilization, which is measured across the entire connection 52, 42, 51, is low (which can be verified by the end-to-end queue time being small), then there is not only zero utilization on the local access link 44, but also little utilization anywhere else along the connection. Therefore, if testing is performed at such time as when discrete utilization is very low, there will be no yellow frame discards performed at that time along the network path, which means that any dropping of frames will be because those frames 120 contained red (automatic discard) bits. Thus, in this method, testing for red bits takes place along a network path across which there is zero local link utilization and near-zero utilization elsewhere.

Continuing the example, in step 64 the throughput (i.e., streaming) measure is 56000 bps and Tc is set to one second. CIR is 28000, and Be is 14000. As shown above this means that at this ingress point 52 to network 42, in each one second interval, the first 14000 bits presented are green, the next 14000 bits presented are yellow, and the next 14000 bits are red. If the timer expires and only 30000 bits have been presented, then the first 28000 would be green and the next 2000 would be yellow. If the Tc timer expired at that point, then a new window would immediately begin and the next 28000 bits transmitted would be green. This will be illustrated hereafter in connection with FIG. 9.

Testing for red frames would be performed as follows. Above it was stated that testing up to this point was performed that determined that the access speed into the network is indeed 56000 bits per second and that there is no utilization at the ingress link and minimal utilization elsewhere in the network. This was accomplished by determining that streaming utilization is zero percent and discrete utilization is low. At this point, in step 70 bursts of (without loss of generality) 70 byte pings are transmitted into the network. The bursts are made increasingly long (i.e., more and more packets 110 per burst) until the following is observed:

1) a period of no discards,
2) followed by a period of discards,
3) followed by a period of no discards,
4) followed by a period of discards,
5) followed by a period of no discards.

Figure 9:
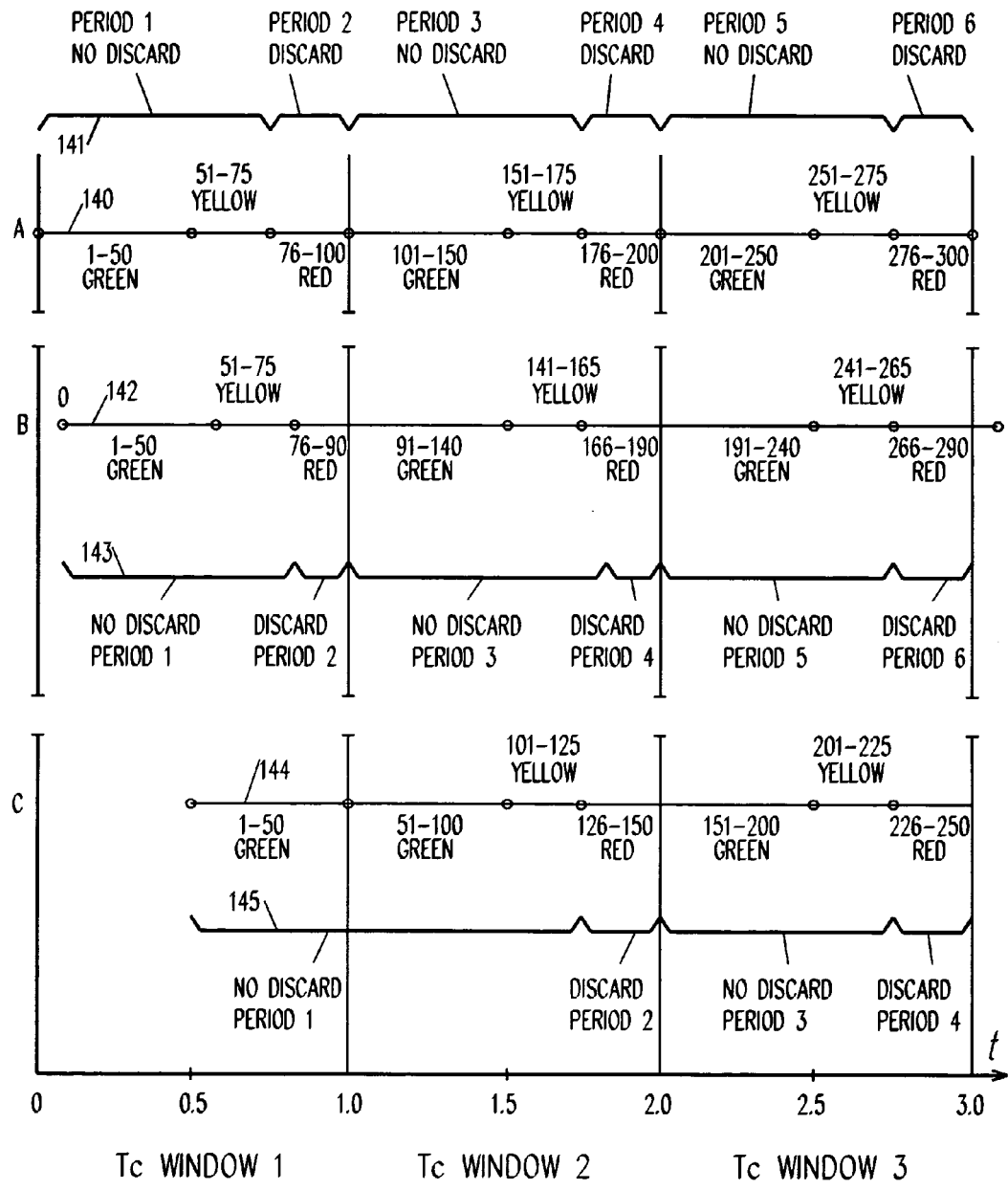
FIG. 9 is a timing diagram representation of various exemplary burst transmissions.

The ingress point's Tc timer 96 runs constantly. When the test burst commences, there is no way to know where within the window the test started. It could be right at the beginning, or somewhere in the middle, or near the end of the window. FIG. 9 illustrates these cases.

Example A is illustrated by line 140 representing a succession of ping packets 1 through 300, with line 141 characterizing the discard status of each of six periods spanning three Tc windows from time t=0 to time t=3.0. Example B is illustrated by lines 142, 143, and example C by lines 144, 145.

In example A, bits 1-50 are green and their transmissions happens to commence exactly at the beginning t=0 of Tc window1. Each 70 byte ping packet has (8*70)=560 bits. So a one second burst of continuous transmission will transmit (in theory, and excluding interframe gaps) exactly 56000 bits, which is 100 packets. In this Example A, since the transmission commenced at exactly the beginning of the Tc window, the first second of the burst fits exactly into Tc window1, and 28000 bits (packets 1 through 50) are green, then 14000 bits are yellow (packets 51 through 75), and then 14000 bits are red (packets 76 through 100). If the burst continued for another second, the pattern would repeat identically, and it would be easy to see that packet loss is occurring periodically for 0.25 seconds every second (discard periods 2, 4, and 6). From this it is deduced that Tc is one second and that the red rate is 0.25 seconds per Tc window and that the red rate is 0.25*56000=14000 bits.

However, care must be taken regarding discerning patterns. Suppose, as is illustrated in Example B, the initial one second burst commences 0.1 seconds after the Tc window has begun. Then the observed red rate would be low if it were calculated based on observation of one Tc's worth of data. This is because the one second burst takes place over the course of 0.9 seconds of one Tc window (because 0.1 second has already elapsed before the test burst is transmitted) and 0.1 seconds of the next Tc window. Within the 0.9 seconds of the first window packets 1 through 50 will be green and packets 51 through 75 will be yellow. At this point of time, the Tc window has 0.15 seconds remaining, and thus the next 15 packets (packets 79 through 90) will be red. After the 90th packet has been transmitted, the Tc clock starts a new one second window, and the ten remaining packets in the burst fall into this Tc window2 so that packets 91 through 100 are green. So in the one second burst test that happens to start one tenth of one second into a Tc window a red rate of 8400 bits is observed (i.e., 15 red packets*70 bytes per packet*8 bits per byte discarded in an observed one second interval). The actual red rate is 14000 bits per second, so this measure would be inaccurately low.

Moreover, as is illustrated by Example C, if a one second test commenced exactly 0.5 seconds into Tc window1, then the first 50 packets would be green and Tc window1 would expire at t=1.0 exactly at the end of transmission of the 50th packet. As the burst continued, a new one second Tc window would start and the remaining fifty packets (packets 51 through 100 of the burst) would be green. In this one second burst test a red rate of zero would be observed and an inaccurate and artificially high CIR+Be (green plus yellow rate) would be deduced.

These examples shows that testing with a burst that covers only one Tc window interval will not be accurate for detecting the red rate or for determining the Tc window duration value. Test bursts must therefore be increasingly longer so as to achieve a pattern in which there is:

1) a period of non-discarding, followed by
2) a period of discarding, followed by
3) a period of non-discarding, followed by
4) a period of discarding, followed by
5) a period of non-discarding.

The reason for needing at least this amount of test bursting is that Period 1 can have more green and yellow bits than indicated by the CIR+Be (as shown in the example above) and because Period 2 can have fewer red bits than the network's actual red rate (as shown in the example above).

However, after Period 2 ends if test bursting continues then it is certain that a new Tc window has just commenced, so Period 3 discloses the network green plus yellow bit rate and Period 4 discloses the network red bit rate and the beginning of Period 5 serves to show the exact end of the Tc window comprised of Periods 3 and 4.

Mathematically, Periods 3 plus Period 4 comprise one complete Tc window, with Period 4 then defining the network automatic discard rate and Period 3 determining the network CIR+Be rate as follows.

Let:
network streaming speed=n,
test packet size transmitted=b bits (8 bits=1 byte),
number of packets observed in Period 4=r,
number of packets observed in Period 3=s.

Then $$Tc=(r+s)*b/n. \qquad (4)$$

$$\text{Automatic Discard Rate}=(r*b)/Tc. \qquad (5)$$

$$CIR+Be=(s*b)/Tc. \qquad (6)$$

The Automatic Discard Rate, Be, and CIR rates are expressed in bits per second, and not bits per Tc window, which is why division by Tc is performed when calculating these values.

In the examples above, the test of the network streaming rate would have shown the network connection to be a 56000 bits per second link, Period 4 would have shown 25 packets of 70 bytes discarded and Period 3 would have shown 75 packets of 70 bytes each successfully transmitted. The calculations would have shown:

$$Tc=(25+75)*560/56000=1 \text{ second}. \qquad (7)$$

$$\text{Automatic Discard Rate}=25*560/1=14000. \qquad (8)$$

$$CIR+Be=75*560/1=42000. \qquad (9)$$

This method gives an accurate measure of a network Tc and Automatic Discard Rate. This method also gives an accurate bit rate for green and yellow network bits as a composite, but without yet having broken that composite into its component parts. In other words, so far the method has determined the composite value of CIR+Be, but to this point the individual values of CIR and Be have not yet been determined. The method for determining CIR and Be is described below.

Once the network speed, Tc, and Automatic Discard (red) Rates have been determined, the network is periodically probed at times when local ingress/egress 52 traffic is known to approach a rate of zero percent but traffic elsewhere along the path (i.e., within the frame relay cloud 42) is tested and found to be high. The method for determining when these conditions hold is as follows.

Public networks do not allow end users to take traces or to access management control blocks in their networks. In other words, suppliers of network services, for reasons of security and privacy do not allow end users to attach sniffers to their network and do not allow access to their network equipment SNMP MIB management information base control blocks in which rates of traffic and rates of packet drops and other such such data are counted and stored. Therefore, the method must provide a means for discovering when it is that there is sufficiently heavy utilization in the backbone 42 of the network sufficient to cause the network to be discarding yellow packets.

The method for discovering the appropriate circumstances for testing the network for yellow frame discard is as follows.

Testing under the method must not take place when the network local point of presence 52 is under use by other users, because it would not be possible to determine which test packets were dropped because they were red and which were dropped because they were yellow. This is because traffic from other users would be interspersed at the local access point, making it impossible to determine accurately the precise cause of packet loss. Even though it may be known that the access link 52 is fully utilized, it cannot be determined whether any given one of the test packets that was dropped was dropped automatically at the interface point or dropped because of utilization elsewhere. The difficulty in interpretation arises because of the "random" interference of traffic from other users. For example, the other users' traffic may have arrived relatively early in a Tc window and pushed the test traffic into the red zone. So the network may at that time be performing no yellow discards, but based on the transmission rate, it might be falsely concluded that the proportion of dropped traffic is high and therefore that test packets are encountering a yellow drop condition. Similarly, traffic from other users might receive service relatively late in a Tc window period, and test packets, when observed to be drops, might well be yellow drops that are mistakenly identified as red packet drops. It is necessary for testing for a network yellow (and green) rate, that means be provided for determining when local utilization is nil and remote utilization is high.

It is a common feature of value add networks that provide quality of service features (including green, yellow, and red bit rates per user) that the bandwidth of the various hops in the middle of network 42 (often called "the cloud" or the "backbone" of the network) are of significantly greater speed than the end user ingress points across which red frames are dropped and frames marked green and yellow are admitted into the backbone and then treated accordingly.

If testing is performed by filling an otherwise empty access link to capacity, then red frames will be dropped according to the Tc value in Period 4 of Examples A and B, and then if the backbone network 42 is currently very heavily used, then yellow packets will be dropped in the backbone while green frames are successfully transported. Under these conditions, the observed rate in Period 3 approaches the green rate.

The method for determining the network CIR (green rate) thus requires testing when the network local ingress 44 utilization is zero percent but utilization in the WAN portion 42 of the network is high. To determine when this condition holds and testing can be performed, testing is performed from branch office 44 to branch office 45 across WAN 42, where ingress links 52 and 53 from the branch offices are known to be of equal speed and are slow relative to WAN 52's link speeds. These requirements are those which will normally be encountered in practice and are easily determined. If streaming speed tests show that the currently available streaming rate equals ingress speeds 52 and 53, then links 52 and 53 have zero utilization. (These tests are performed according to Silverman, et al. If at the same time that there is zero utilization on the local ingress links it is discovered that there is zero utilization but that across the same end-to-end path there is high discrete utilization, then all of that utilization must be in the WAN portion of the network. If testing is performed between branch offices 44 and 45 across WAN 52 at that time, and if the automatic discard (red) rate is known, then any packet drops performed over and above the red rate will be yellow drops that are caused by congestion in the WAN portion of the network. Testing is thus performed under these conditions so as to observe the maximum total drop rate over time. The successful transmission rate at that time per second is the green rate.

The mathematical expression of the method is as follows: testing is performed when local ingress utilization is zero and discrete utilization is high. The following pattern will be observed:
1) a period1 of non-discarding, followed by
2) a period2 of discarding, followed by
3) a period3 of non-discarding, followed by
4) a period4 of discarding, followed by
5) a period5 of non-discarding.

Referring to FIG. 9, in this case, when WAN 42 utilization is sufficiently high that all yellow packets are discarded, period3 will comprise one TC window worth of green frames only, and period4 will consist of one TC window worth of yellow plus red packets. Since Tc is known, and the red rate determined from earlier steps in the method, the yellow and green rates are easily derived.

Let:
network streaming speed=n,
test packet size transmitted=b bits (8 bits=1 byte),
number of packets observed in Period4=r,
number of packets observed in Period3=s,
Tc=t (determined in earlier test)
Automatic Discard Rate=a (determined in earlier test).
CIR is the network's green rate per second
Be is the network's yellow rate Then $$CIR=(s*b)/t \qquad (10)$$

$$Be=n(((s*b)/t)-a) \qquad (11)$$

$$\text{Automatic Discard Rate}=(r*b)/Tc. \qquad (12)$$

$$CIR+Be=(s*b)/Tc. \qquad (13)$$

The Automatic Discard Rate, Be, and CIR rates are expressed in bits per second, and not bits per Tc window, which is why division by Tc is performed when calculating these values.

In the preceding example, the test of the network streaming rate shows the network connection 52 to be a 56000 bits per second link, period4 shows 25 packets of 70 bytes discarded and period3 shows 75 packets of 70 bytes each successfully transmitted. The calculations are:

$$Tc=(25+75)*560/56000=1 \text{ second}. \qquad (14)$$

$$\text{Automatic Discard Rate}=25*560/1=14000. \qquad (15)$$

$$CIR+Be=75*560/1=42000. \qquad (16)$$

Tc clock runs continuously. So the odds of starting transmission exactly at the beginning of a TC interval are close to zero. So the transmission will span a portion of one Tc interval window1, then an entire interval window2, then at least another portion of an interval window3. In general, if a transmission spans n Tc intervals, then n−2 identical patterns (period2 with period 3 and period 4 with period 5) will be evaluated by packet evaluator 94 surrounded by 2 patterns of fewer (or no) discards.

This is the "pattern" and it is, to be mathematically precise, "For a burst that of a time length that is at least n but less than n+1 Tc intervals, there will be at least n−2 (and no more than n) identical patterns of red packet loss observed."

In a further example, the red rate and Tc are calculated as follows.

Successively longer continuous packet 110 bursts are transmitted into a network 42 in which there is currently otherwise little to no utilization on the local connection 52 to the frame-relay network and little to no utilization in the backbone 42 of the frame relay network. Tc and automatic network discard functions being tested work only on the local ingress portion 52 of the network. The state of the portion of the network 42 other than the ingress portion must also be determined because yellow packets will be dropped in the non-ingress backbone portion if there is very heavy utilization in the backbone. The network measurement interval works independently at each of the network local ingress points, clocking fixed intervals of time.

If at the ingress point being tested the Tc value is set at one second, and if the ingress speed is 56000 bits per second, then Tc spans a 56000 bit interval. At that same ingress point, were the Tc value set to two seconds, then Tc would span a 112000 bit interval.

The network is tested by sending increasingly long bursts of short (e.g., 64 byte) ping (or other) packets 110 into the network through the local ingress point 52 and by watching for a pattern of packet discards.

For purposes of measuring utilization, reference is made to Silverman, et al., wherein is described the distinction between a network end-to-end streaming utilization and its discrete utilization. Specifically, routers and other devices in the network treat packets they receive and which they must forward in one of two ways: either they receive the entire packet, check its integrity, class of service, and forward path requirements before re-transmitting the packet (store-and-forward); or else they commence forwarding the packet as soon as the header is received (cut through).

Most routers are of the store-and-forward variety. This means that each router along the network path slows the end-to-end transmission time by requiring complete re-serialization at each hop. Utilization at each hop will cause an additional queuing delay. Utilization is a measure of the time taken or delay experienced in a router or other device to retransmit a package. Thus, the response time across a network for an individual packet is affected by both the link speed and utilization at each network hop.

Unlike an individual packet rate, the streaming rate of traffic across the network is determined not at each network hop 61, 63, 65, but only by the bottleneck hop in the network. Utilization at the bottleneck will further degrade the effective rate that streaming traffic will achieve across the network. However, utilization at points other than the bottleneck will not affect the effective rate through the network unless they degrade the effective speed on that link to below the previously existing bottleneck rate.

For example, if a network comprises one 19200 bps and one 9600 bps hop, and there is 0% utilization on each hop, the streaming rate through the network would be 9600 bps. If the 9600 bps link were 50% utilized then the currently available streaming rate of the network would be 4800 bps. If the 9.6 link had 0% utilization and the 19200 link had 50% utilization, then the 19200 link would have an effective throughput (of approximately) 9600 bps, and the network bottleneck and currently available streaming rate would remain 9600 bps.

With this background in mind, it is observed that if a frame relay or other network with delivery options including automatic discard, best effort, and guaranteed levels of service is tested, then:

Test A) If testing is performed by sending bursts of packets into the network at an access point when there is zero utilization in that local access portion of the network and very low utilization in the backbone portion of the network, then any packets that are dropped will not be dropped in the backbone, but only within the access point because of the automatic discard function.

This is the method employed to test for the network's automatic discard (red) rate.

Test B) If testing is performed by sending bursts of traffic into the network when utilization on the local access link is zero but utilization elsewhere in the network is high, then the bursts of traffic will encounter a known local loss rate (as determined in test A) of automatically discarded bits and packets, and any additional loss will result from the discarding of best effort delivery bits and packets within the network backbone.

Thus, together, tests A and B provide for testing the network red (automatic discard) and yellow (best effort delivery) rates.

Test A must be performed when the network is empty (i.e., when there is zero utilization in the network access portion of the network and low utilization in the backbone). In order to determine when this test can be performed, initial testing is performed that establishes both the streaming and discrete utilization of the network. Streaming utilization and discrete utilization is determined as per Silverman, et al. Test A is performed at a time when streaming utilization is zero percent and discrete utilization is near zero (indicative of zero local and low global utilization). Test B is performed when streaming utilization is zero but discrete utilization is high (indicative of zero local network access utilization with high non-local utilization).

Red packet test results will depend not only on network ingress speed, ingress utilization, Tc window size, CIR rate, and Be; but also upon where within the Tc window the test begins. Since the user has no way of synchronizing the beginning of a test with the exact beginning of a Tc window, and since the test method must ensure that calculations of Tc size and the automatic discard (red) rate of the network are based upon measurement of discards over a full window, the method is based upon transmission of increasingly lengthy bursts into an otherwise empty ingress point until the following continuous pattern is observed:

First, a period of no packet discards, followed by
Second, a period of packet discards, followed by
Third, a period of no packet discards, followed by
Fourth, a period of packet discards.

In the most economical implementation of the method, the Tc window size and the discard rate are calculated from the second and third periods above, because the second period described covers exactly one period of automatic (red) packet discards and the third period covers exactly one period of (green plus yellow) successful transmissions.

Any packet 120 that contains a bit that is discarded will be corrupted, and it will be discarded. So for any packet that is discarded, it is not known whether one, some, or all of its bits were discarded. By using the smallest possible packet size, the error in measurement is minimized. For example, on a 56000 bits per second link, the variance as to how many bits were discarded if a packet is lost is less than 1% of the link's bandwidth, so the error is minimal.

Referring to FIG. 10, testing conditions are summarized. When discrete utilization is high and streaming utilization is high, testing is not valid. It is not possible to have low discrete utilization together with high streaming utilization, so testing is not possible. With discrete utilization low and streaming utilization zero, no yellow packets are discarded, and testing for red packets is conducted. With discrete utilization high, and streaming utilization low, yellow and red packets are being discarded, so testing for yellow is done.

The relative terms substantially zero, and high and low refer to conditions under which testing yields usable results, perhaps as modified by the jitter corrections, as described in the above examples and discussion, and as will be appreciated by those of ordinary skill in the art, need be no more precisely stated.

Alternative Embodiments

Figure 11:
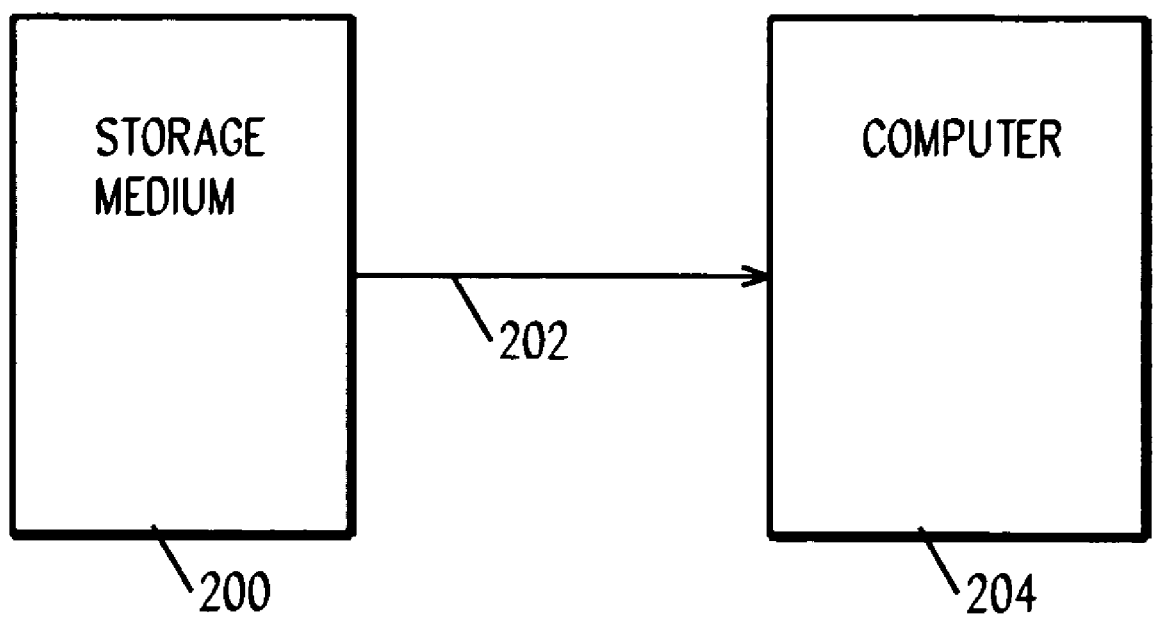
FIG. 11 is a high level system diagram illustrating a program storage device readable by a machine, tangibly embodying a program of instructions executable by a machine to perform a method for determining network characteristics.

It will be appreciated that, although specific embodiments of the invention have been described herein for purposes of illustration, various modifications may be made without departing from the spirit and scope of the invention. Referring to FIG. 11, in particular, it is within the scope of the invention to provide a computer program product or program element, or a program storage or memory device 200 such as a solid or fluid transmission medium, magnetic or optical wire, tape or disc, or the like, for storing signals readable by a machine as is illustrated by line 202, for controlling the operation of a computer 204, such as a host system or storage controller, according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each the step, or a file or object or the like implementing each the step, may be executed by special purpose hardware or a circuit module designed for that purpose.

Accordingly, the scope of protection of this invention is limited only by the following claims and their equivalents.

I claim:

1. A method for determining network characteristics, comprising:

evaluating network streaming speed to determine network ingress access speed;

evaluating network streaming utilization to determine ingress point utilization;

evaluating network discrete speed to determine network path speed;

evaluating network discrete utilization to determine network path utilization;

testing while said ingress point utilization at a test ingress point to said network is substantially zero and said network path utilization across an entire network path is low to determine network time constant (Tc) and automatic discard or red rate; and testing while said ingress point utilization at said test ingress point is substantially zero and said network path utilization across said entire network path is high to determine network committed information rate or green rate and network burst excess or yellow rate.

2. The method of claim 1, said testing further comprising sending a plurality of bursts of packets into said network at said ingress point, receiving said packets back at said ingress point, determining which of said packets are not received back, and determining elapsed time between said sending and receiving for packets received back.

3. The method of claim 2, further comprising determining said network streaming speed to be bits in a plurality of test bursts divided by average receipt time for said bursts.

4. The method of claim 3, further comprising determining said network streaming utilization to be said network streaming speed during a first test period divided by average network streaming speed over a substantially larger second test period.

5. The method of claim 4, further comprising determining said network discrete speed to be (long packet bits−short packet bits)/(best long time−best short time).

6. A program storage device readable by a computer, tangibly embodying a program of instructions executable by a computer characteristics, said method comprising:
measuring network streaming speed to determine network ingress access speed;
measuring network streaming utilization to determine ingress point utilization;
measuring network discrete speed to determine network path speed;
measuring network discrete utilization to determine network path utilization;
testing while said ingress point utilization at a test ingress point to said network is substantially zero and said network path utilization across an entire network path is low to determine network time constant (Tc) and automatic discard or red rate; and
testing while said ingress point utilization at said test ingress point is substantially zero and said network path utilization across said entire network path is high to determine network committed information rate or green rate and network burst excess or yellow rate.

7. The program storage device of claim 6, said method further comprising sending a plurality of bursts of packets into said network at said ingress point, receiving said packets back at said ingress point, determining which of said packets are not received back, and determining elapsed time between said sending and receiving for packets received back.

8. The program storage device of claim 7, said method further comprising:
upon detecting significant utilization at said test ingress point, determining network jitter due to third party network utilization; and responsive thereto revising said red rate, yellow rate, and green rate to account for said jitter.

9. The program storage device of claim 6, said method further comprising determining said network streaming speed to be bits in a plurality of test bursts divided by average receipt time for said bursts.

10. The program storage device of claim 9, said method further comprising determining said network streaming utilization to be said network streaming speed during a first test period divided by average network streaming speed over a substantially larger second test period.

11. The program storage device of claim 10, said method further comprising determining said network discrete speed to be (long packet bits−short packet bits)/(best long time−best short time).

12. A method for determining network characteristics, comprising:
transmitting test packet sequences through said network for determining network discrete speed; determining network streaming speed; determining network discrete utilization; and determining network streaming utilization;
upon detecting that said network streaming utilization is low and said network discrete utilization is low, evaluating said test packet sequences for a first discard pattern, said first discard pattern representing actual discard or red rate; and
upon detecting that said network streaming utilization is low and said network discrete utilization is high, evaluating said test packet sequences for a second discard pattern, said second discard pattern representing effective discard or yellow rate and effective non-discard or green rate.

13. The method of claim 12, further comprising:
upon detecting significant utilization at an access node, determining network jitter and responsive thereto revising said red rate, yellow rate, and green rate to account for third party network utilization.

14. A system for determining network characteristics, comprising:
a processor including a packet generation component and a packet evaluation component;
said packet generation component for generating send test packets for communication into said network;
said packet evaluation component responsive to receive test packets for determining network speed and utilization, and
upon detecting that network streaming utilization is not significantly high and discrete utilization is low, evaluating said test packet sequences for a first discard pattern, said first discard pattern representing actual discard or red rate, and
upon detecting that said network streaming utilization is low and said discrete utilization is high, evaluating said test packet sequences for a second discard pattern, said second discard pattern representing effective discard or yellow rate and effective non-discard or green rate.

15. The system of claim 14, said packet generation component further for sending a plurality of bursts of packets into said network at an ingress point and receiving said packets back at said ingress point; and said packet evaluation component further for determining which of said packets are not received back, and determining elapsed time between said sending and receiving for packets received back.

16. The system of claim 15, said packet evaluation component further for determining network streaming speed to determine network ingress access speed, said network streaming speed being bits in a plurality of test bursts divided by average receipt time for said bursts.

17. The system of claim 16, said packet evaluation component further for determining network streaming utilization to determine ingress point utilization, said network streaming utilization being said network streaming speed during a first test period divided by average network streaming speed over a substantially larger second test period.

18. A program storage device readable by a machine, tangibly embodying a program of instructions executable by a machine to perform a method for determining network characteristics, said method comprising:
transmitting test packet sequences through said network for determining network discrete speed;
determining network streaming speed;
determining network discrete utilization;
determining network streaming utilization;
upon detecting that said network streaming utilization is not significantly high and said network discrete utilization is low, evaluating said test packet sequences for a first discard pattern, said first discard pattern representing actual discard or red rate; and
upon detecting that said network streaming utilization is not significantly high and said discrete utilization is high, evaluating said test packet sequences for a second discard pattern, said second discard pattern representing effective discard or yellow rate and effective non-discard or green rate.

19. The program storage device of claim 18, said method further comprising sending a plurality of bursts of packets into said network at said ingress point, receiving said packets back at said ingress point, determining which of said packets are not received back, and determining elapsed time between said sending and receiving for packets received back.

* * * * *